United States Patent
Marchya et al.

(10) Patent No.: US 10,777,169 B2
(45) Date of Patent: Sep. 15, 2020

(54) SYSTEMS AND METHODS TO SYNCHRONIZE DISPLAY PANELS

(71) Applicant: QUALCOMM Incorporated, San Diego, CA (US)

(72) Inventors: Dileep Marchya, Hyderabad (IN); Balamukund Sripada, Hyderabad (IN); Srinivas Pullakavi, Kakinada (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/215,170

(22) Filed: Dec. 10, 2018

(65) Prior Publication Data

US 2020/0184928 A1    Jun. 11, 2020

(51) Int. Cl.
*G09G 5/12*    (2006.01)
*G06F 3/14*    (2006.01)

(52) U.S. Cl.
CPC .............. *G09G 5/12* (2013.01); *G06F 3/1446* (2013.01); *G06F 3/1454* (2013.01); *G09G 2360/18* (2013.01)

(58) Field of Classification Search
None
See application file for complete search history.

(56) References Cited

U.S. PATENT DOCUMENTS

| 2016/0125845 | A1* | 5/2016 | Oh | G09G 3/3666 |
| | | | | 345/214 |
| 2018/0040298 | A1* | 2/2018 | Chu | G09G 3/3406 |
| 2018/0314483 | A1* | 11/2018 | Liu | G06F 3/1446 |

* cited by examiner

*Primary Examiner* — Kenneth B Lee, Jr.
(74) *Attorney, Agent, or Firm* — Patterson + Sheridan, LLP

(57) ABSTRACT

Certain aspects of the present disclosure provide a method for driving a plurality of display panels including a first display panel and a second display panel. The method includes receiving a first synchronization signal from the first display panel. The method further includes receiving a second synchronization signal from the second display panel. The method further includes determining a phase difference between the first synchronization signal and the second synchronization signal. The method further includes computing at least one phase shift offset based on the determined phase difference, the at least one phase shift offset being configured to reduce the phase difference between the first synchronization signal and the second synchronization signal. The method further includes providing a first phase shift offset of the at least one phase shift offset to the first display panel. The method further includes providing a unified synchronization signal to a display processor.

18 Claims, 3 Drawing Sheets

SYSTEMS AND METHODS TO SYNCHRONIZE DISPLAY PANELS

TECHNICAL FIELD

Certain aspects of the present disclosure generally relate to driving a plurality of display panels and, more particularly, to techniques for synchronizing a plurality of display panels.

BACKGROUND

Computing devices may be coupled to a plurality of display panels and be configured to render images as content that is displayed on the plurality of display panels. For example, a computing device coupled to a plurality of display panels can be a dual or multiple screen smartphone, mobile device, laptop, desktop, vehicle, utility device, etc.

The computing device can be configured to display content on the plurality of displays according to one or more different modes, such as a mirrored mode, extended mode, exclusive mode, etc. In the mirrored mode, the same content is displayed on each of the plurality of displays. In certain aspects, in the mirrored mode, content for display on each of the plurality of displays is held in a single buffer and the entire content from the single buffer is displayed on each of the plurality of displays. In the extended mode, a view (e.g., application view) is extended across the plurality of displays, and the displays may each display different content. In certain aspects, in the extended mode, content for display on each of the plurality of displays is held in a single large buffer that holds content for all of the plurality of displays and the content is then split between the plurality of displays for display. In the exclusive mode, different content is displayed on different displays of the plurality of displays. In certain aspects, in the exclusive mode, content for each display is held in a separate buffer.

SUMMARY

Certain aspects of the present disclosure provide a system for driving a plurality of display panels including a first display panel and a second display panel. The system includes a display processor coupled to the plurality of display panels. The system further includes a controller coupled to the display processor and the plurality of display panels. The controller is configured to receive a first synchronization signal from the first display panel. The controller is further configured to receive a second synchronization signal from the second display panel. The controller is further configured to determine a phase difference between the first synchronization signal and the second synchronization signal. The controller is further configured to compute at least one phase shift offset based on the determined phase difference, the at least one phase shift offset being configured to reduce the phase difference between the first synchronization signal and the second synchronization signal. The controller is further configured to provide a first phase shift offset of the at least one phase shift offset to the first display panel. The controller is further configured to provide a unified synchronization signal to the display processor.

Certain aspects of the present disclosure provide a method for driving a plurality of display panels including a first display panel and a second display panel. The method includes receiving a first synchronization signal from the first display panel. The method further includes receiving a second synchronization signal from the second display panel. The method further includes determining a phase difference between the first synchronization signal and the second synchronization signal. The method further includes computing at least one phase shift offset based on the determined phase difference, the at least one phase shift offset being configured to reduce the phase difference between the first synchronization signal and the second synchronization signal. The method further includes providing a first phase shift offset of the at least one phase shift offset to the first display panel. The method further includes providing a unified synchronization signal to a display processor.

Certain aspects of the present disclosure provide a non-transitory computer-readable storage medium that includes instructions that when executed by a processor cause the processor to perform a method for driving a plurality of display panels including a first display panel and a second display panel. The method includes receiving a first synchronization signal from the first display panel. The method further includes receiving a second synchronization signal from the second display panel. The method further includes determining a phase difference between the first synchronization signal and the second synchronization signal. The method further includes computing at least one phase shift offset based on the determined phase difference, the at least one phase shift offset being configured to reduce the phase difference between the first synchronization signal and the second synchronization signal. The method further includes providing a first phase shift offset of the at least one phase shift offset to the first display panel. The method further includes providing a unified synchronization signal to a display processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Figure 1:
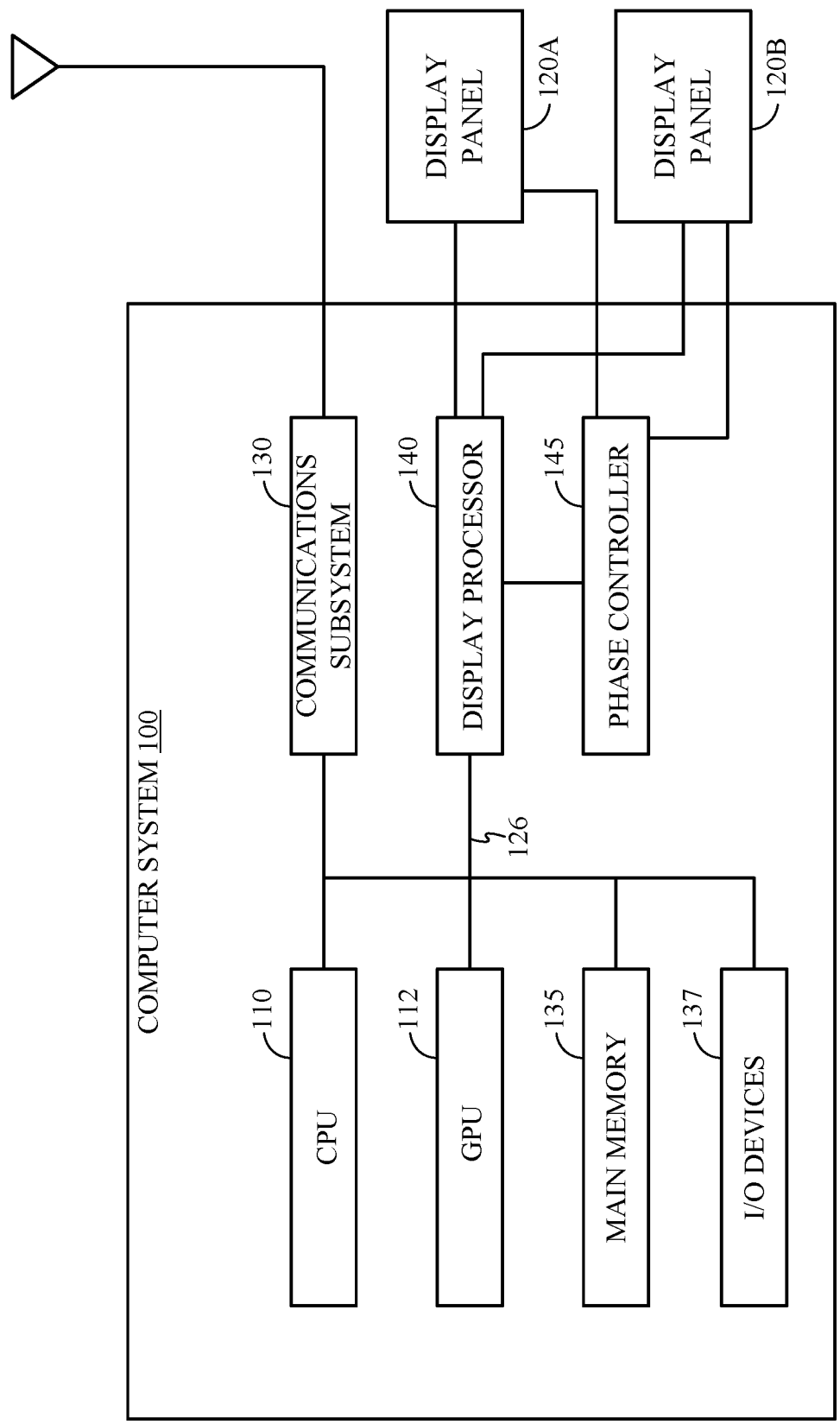
FIG. 1 illustrates an embodiment of a computer system configured to drive a plurality of display panels, according to certain aspects of the present disclosure.

Certain aspects herein relate to systems and methods for synchronizing a plurality of display panels driven by a computing device, such as computer system 100 of FIG. 1.

FIG. 1 provides a schematic illustration of one embodiment of a computer system 100 that can perform the methods provided by various other aspects. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 126 (or may otherwise be in communication, as appropriate). The hardware elements may include a CPU 110, which can include without limitation one or more general-purpose processors, one or more special-purpose processors, and/or other processing means. The bus 126 may couple two or more of the CPUs 110, or multiple cores of a single CPU or a plurality of CPUs. Hardware elements may also include one or more input/output devices 137, which can include without limitation one or more GPS receivers (and or receivers from any other Satellite Positioning System (SPS)), accelerometers, gyroscopes, magnetometers (and/or other orientation sensors), altimeters, cameras, and/or other sensors. Other devices such as a touch pad, keyboard, microphone, and/or the like may also be included.

The computer system 100 may further include a main memory 135, which can comprise, without limitation, a random access memory ("RAM"), such as a dynamic random-access memory (DRAM), such as, double data rate (DDR) synchronous DRAM (SDRAM).

The computer system 100 further includes a GPU 112, which is a special purpose processor for handling graphics processing. The computer system 100 further includes a display processor 140 configured to drive display panels 120A and 120B. In certain aspects, the display processor 140 may corresponds to one or more processors (e.g., graphics processing unit (GPU), central processing unit (CPU), etc.) configured to at least in part act as a display processor and process and render multimedia data (e.g., images, scenes, videos, etc.) displayed on the display panels 120A and 120B.

The computer system 100 might also include a communications subsystem 130, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 130 may include one or more input and/or output communication interfaces to permit data to be exchanged with a network, other computer systems, and/or any other electrical devices/peripherals.

The computer system 100 also can comprise software elements, such as located within the main memory 135, including an operating system, device drivers, executable libraries, and/or other code, such as one or more application(s), which may comprise computer programs provided by various embodiments, and/or may be designed to implement methods, and/or configure systems, provided by other embodiments, as described herein. Merely by way of example, a portion of one or more procedures described with respect to the method(s) discussed herein, might be implemented as code and/or instructions executable by a computer (and/or a processing unit within a computer); in an aspect, then, such code and/or instructions can be used to configure and/or adapt a general purpose computer (or other device, such as one or more of CPU 110, GPU 112, display processor 140, etc.) to perform one or more operations in accordance with the described methods.

A set of these instructions and/or code might be stored on a non-transitory computer-readable storage medium. In some cases, the storage medium might be incorporated within a computer system, such as computer system 100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements.

In certain aspects, each display panel 120A and 120B is configured to autonomously refresh based on a timing engine (e.g., clock circuit, etc.) of the display panel 120A/B. For example, each display panel 120A and 120B may be one of a command mode panel, video mode panel, etc. that autonomously refreshes. Accordingly, each display panel 120A and 120B self-refreshes according to a self-refresh timeline that is specific to the display panel.

Figure 2:
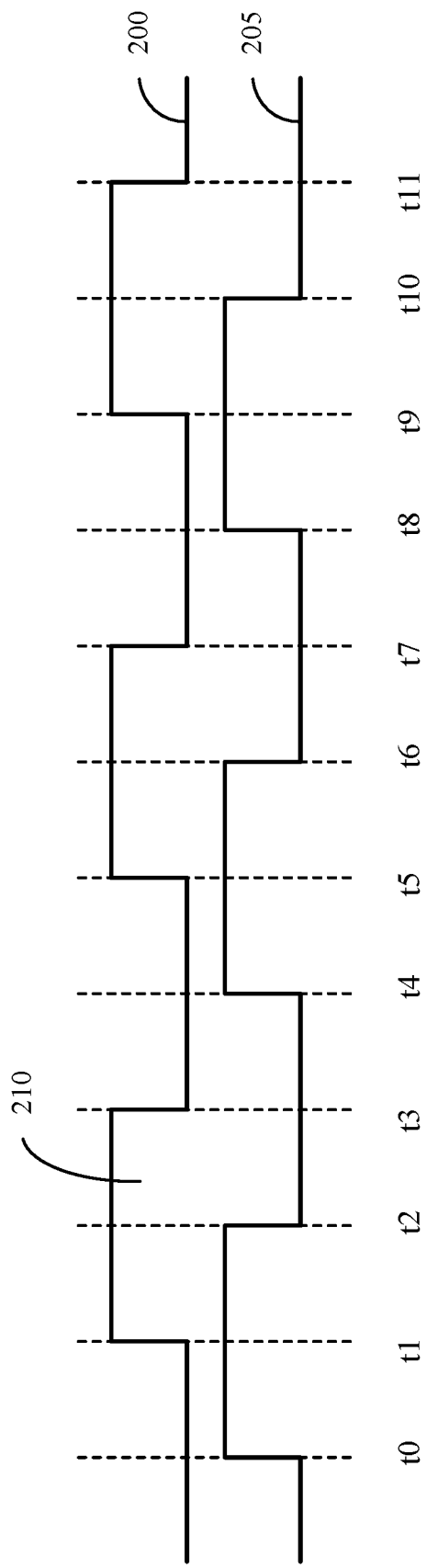
FIG. 2 illustrates example self-refresh timelines for display panels according to certain aspects.

FIG. 2 illustrates example self-refresh timelines for display panels 120A and 120B according to certain aspects. For example, self-refresh timeline 200 corresponds to display panel 120A and self-refresh timeline 205 corresponds to display panel 120B. As shown, each of self-refresh timelines 200 and 205 includes a series of pulses 210. For example, self-refresh timeline 200 includes a pulse 210 that starts (e.g., has a rising edge) at time t1 and ends (e.g., has a trailing edge) at time t3. In certain aspects, the self-refresh timelines for display panels 120A and 120B are periodic, such as having a frequency of 60 Hz meaning a periodicity of ~16.6 ms. For example, time t1 to t5 corresponds to a single period of self-refresh timeline 200. Accordingly, in certain aspects, the pulses 210 are periodic in self-refresh timelines 200 and 205.

In certain aspects, each of the display panels 120A and 120B refreshes according to each pulse 210 of its respective self-refresh timeline. For example, with reference to display panel 120A and self-refresh timeline 200, at the start/rising edge of a pulse, such as at time t1, the display panel 120A refreshes to display a frame of data. The frame of data corresponds to an image rendered by computer system 100. The display panel 120A further refreshes at each of times t5 and t9.

In certain aspects, the self-refresh timelines 200 and 205 correspond to synchronization signals (e.g., vertical synchronization (vsync) signals) generated by display panels 120A and 120B, respectively. Display panels 120A and 120B may provide such synchronization signals to computer system 100. Portions of computer system 100 may utilize the synchronization signals to synchronize the functioning of other components in the computer system 100 with the refresh of display panels 120A and 120B. For example, one or more of CPU 110, GPU 112, and display processor 140 may utilize synchronizations signals to perform rendering of images and storage of data corresponding to the rendered images in buffers (e.g., of one or more of CPU 110, GPU 112, and display processor 140). The storage of a rendered image in a display buffer (e.g., and also the rendering of the image itself) may be referred to as generating a frame buffer.

For example, CPU 110 may issue a command to GPU 112 or display processor 140 to render an image for display on display panel 120A (and/or similarly display panel 120B). The GPU 112 or display processor 140 then renders the image and stores the image in a display buffer in display processor 140. For example, CPU 110 may issue a command to GPU 112 or display processor 140 to render an image for display based on the synchronization signal, such that the GPU 112 or display processor 140 renders the image and stores it in the display buffer prior to or in time for the next refresh of the display panel 120A, e.g., for the next pulse 210. In other aspects, the rendering of images and storage into the display buffer may be asynchronous with the synchronization signal.

The display processor 140 presents/scans the current image (e.g., line by line) from the display buffer to the display panel 120A during the pulse 210, e.g., starting at the rising edge and until the falling edge. The presenting/scanning a current image from the display buffer to a display panel may be referred to as transferring a frame buffer to the display panel. The display panel 120A accordingly is refreshed periodically to display the current image in the display buffer.

In certain aspects, the self-refresh timelines 200 and 205 for display panels 120A and 120B, respectively, begin based on when the particular display panel 120A or 120B is powered on. It may not be feasible to power on each of the display panels 120A and 120B at exactly the same time. For example, there may be a number of milliseconds difference between the powering on of different display panels. Accordingly, the self-refresh timelines for different display panels may not be aligned, and therefore, there may be a phase difference between the self-refresh timelines, such as the pulses of the self-refresh timelines may not be aligned. In addition, a display panel's self-refresh timeline may drift, such as depending on temperature conditions and other interference conditions, which can further lead to phase differences between self-refresh timelines of different display panels. For example, in FIG. 2, self-refresh timelines 200 and 205 are not in phase with one another, for example as shown as a difference in start time of t1 and t0 for pulses 210 for self-refresh timelines 200 and 205.

In certain cases, the phase difference between self-refresh timelines of multiple display panels of a computer device can cause certain inefficiencies or display artifacts. For example, since the self-refresh timelines 200 and 205 are not aligned, computer system 100 may need to synchronize the functioning of other components in the computer system 100 with the refresh of both of display panels 120A and 120B. This may mean that interrupts for performing the various functions for rendering and displaying images, as well as other functions, may need to be generated and handled based both on self-refresh timelines 200 and 205. The number of interrupts handled by computer system 100 may therefore increase as a factor of the number of display panels, which is computationally expensive, uses additional power to wake up components of the computer system 100, and may hinder performance of the computer system 100.

In another example, if the computer system 100 is operating the display panels 120A and 120B in a mirrored mode, as discussed, a single display buffer is used to store rendered images for scanning to display panels 120A and 120B. Accordingly, the data may need to be held in the display buffer for longer than a single refresh period (e.g., longer than a single pulse 210) to scan to both display panels 120A and 120B. For example, with reference to self-refresh timelines 200 and 205, a single frame of image data may need to be held in the display buffer from time t0 to t3. During this period, a next frame of image data cannot be written into the display buffer, meaning it may not be available for the next refresh period of one or both of display panels 120A and 120B, leading to dropped frames.

In another example, the refresh of the screens will not be in sync, which can lead to a bad visual experience for a user.

Accordingly, certain aspects herein relate to techniques for synchronizing display panels of a computing device. For example, certain aspects relate to synchronizing the self-refresh timelines/synchronizations signals of display panels of a computing device, such as by reducing or eliminating a phase difference between the self-refresh timelines/synchronizations signals. In addition, certain aspects relate to presenting a single synchronization signal to components of a computing device for driving multiple displays. Accordingly, certain aspects reduce or eliminate the discussed inefficiencies or display artifacts. Though certain aspects are described with respect to two display panels, one of ordinary skill in the art will appreciate that the techniques can similarly be applied to any number of display panels.

As shown in FIG. 1, computer system 100 further includes a phase controller 145. The phase controller 145 is coupled to each of display panels 120A and 120B, as well as to display processor 140. In certain aspects, phase controller 145 is configured to reduce or eliminate a phase difference between self-refresh timelines/synchronizations signals. In certain aspects, phase controller 145 is configured to present/generate a single unified synchronization signal from a plurality of synchronization signals.

Figure 3:
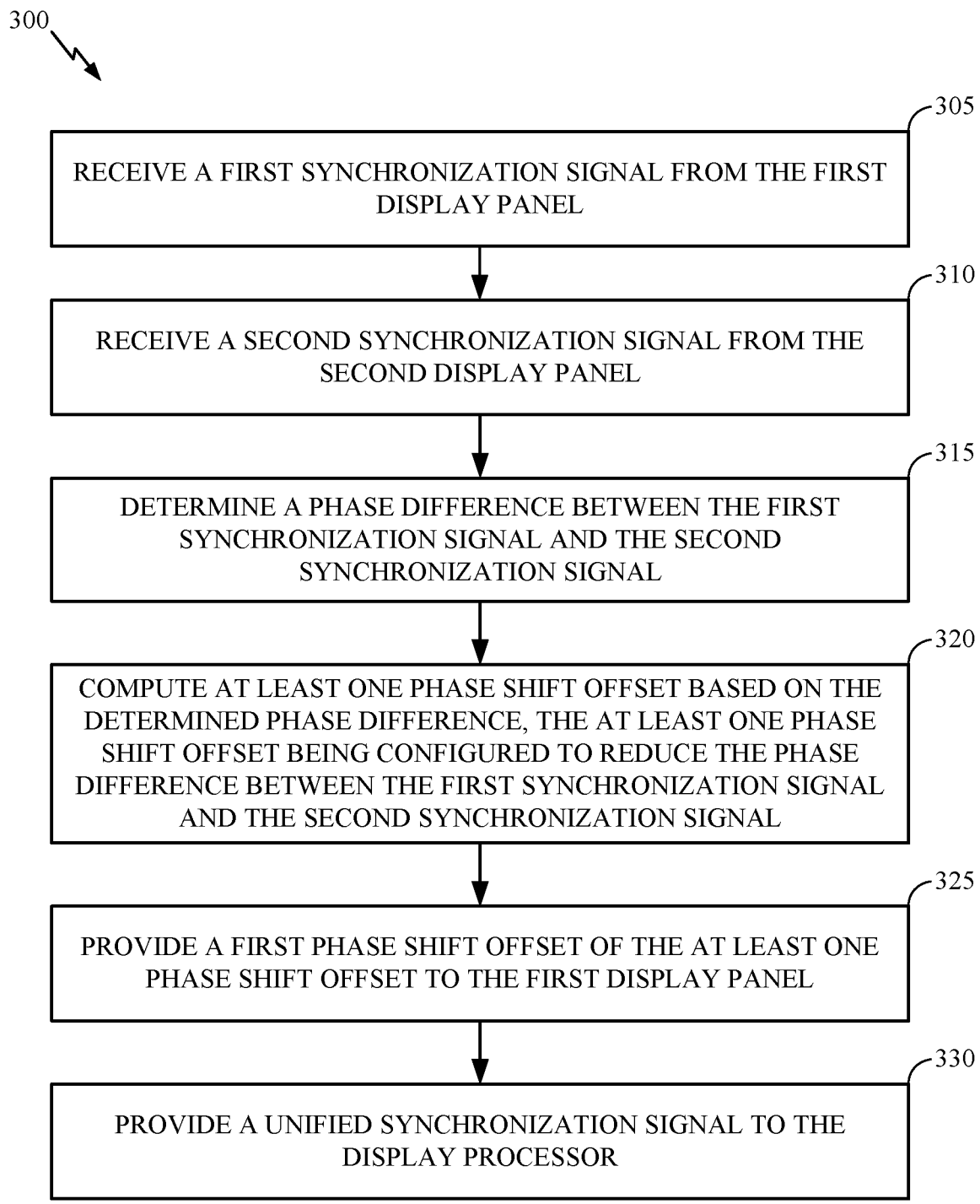
FIG. 3 illustrates example operations for driving a plurality of display panels, in accordance with certain aspects of the present disclosure.

FIG. 3 illustrates example operations 300 for driving a plurality of display panels comprising a first display panel and a second display panel, in accordance with certain aspects of the present disclosure. For example, phase controller 145 may be configured to perform the operations 300.

At block 305, phase controller 145 receives a first synchronization signal from a first display panel. For example, phase controller 145 receives a first synchronization signal corresponding to self-refresh timeline 200 from display panel 120A.

At block 310, phase controller 145 receives a second synchronization signal from a second display panel. For example, phase controller 145 receives a second synchronization signal corresponding to self-refresh timeline 205 from display panel 120B.

At block 315, phase controller 145 determines a phase difference between the first synchronization signal and the second synchronization signal. For example, phase controller 145 may determine the difference in time between rising edges of pulses between the first synchronization signal and the second synchronization signal. In certain aspects, the maximum drift in phase difference, or phase difference, between the synchronization signals is +/− half a period of the synchronization signal (e.g., 8.3 ms). In particular, any greater difference in phase between, for example, the start of two pulses of two separate synchronizations signals means that the start of another set of pulses between the two separate synchronizations signals are closer in time.

At block 320, phase controller 145 computes at least one phase shift offset based on the determined phase difference, the at least one phase shift offset being configured to reduce the phase difference between the first synchronization signal and the second synchronization signal. For example, the phase controller 145 may compute a phase shift offset for only one display panel, each display panel, a subset of the display panels, etc. In the example of self-refresh timelines 200 and 205, the phase difference is t1−t0. Accordingly, in an example, phase controller 145 could generate a phase shift offset equal to t1−t0 for just display panel 120B, a phase shift offset of t0−t1 for just display panel 120A, or phase shift offsets for both display panel 120B and 120A that together synchronize self-refresh timelines 200 and 205. As will be described further herein, the phase shift offset(s) computed may not always fully synchronize the synchronizations signals. Accordingly, in certain aspects, multiple phase shift offsets may be computed for a single display panel to be provided at different times.

At 325, phase controller 145 provides a first phase shift offset of the at least one phase shift offset to the first display panel. For example, phase controller 145 provides the phase shift offset(s) computed at block 320 to display panel 120A and/or 120B depending on for which panels a phase shift offset was computed. In certain aspects, phase shift offsets may be provided at a time for multiple display panels. The display panels 120A and/or 120B are configured to shift their synchronizations signals/self-refresh timelines by the amount indicated in the phase shift offset. Accordingly, phase difference between the display panels 120A and 120B can be reduced.

At 330, phase controller 145 provides a unified synchronization signal to a computing device (e.g., computer system 100, such as to display processor 140). For example, if/when the synchronization signals for the display panel 120A and 120B are synchronized and not out of phase, the phase controller 145 provides the unified synchronization signal as a single signal to components of the computing device to operate, such as discussed. In certain aspects, controller 145 provides the unified synchronization signal to the computing device instead of separate synchronization signals from each of display panel 120A and 120B even if/while the synchronization signals for the display panel 120A and 120B are out of phase.

In certain aspects, phase controller 145 may not perform all of the operations 300 (e.g., phase controller 145 may not perform block 330). In certain aspects, phase controller 145 may perform additional operations.

In certain aspects, computer system 100 is configured to power on phase controller 145 only when there are at least two display panels active. For example, in certain aspects, display processor 140 is configured to determine a number of active displays panels of the plurality of display panels; and power on the controller when the number of active display panels is two or more.

In certain aspects, display processor 140 is configured to, in response to receiving the unified synchronization signal, generate one or more frame buffers. Further, in response to receiving the unified synchronization signal, the display processor 140 is configured to one of: transfer a first frame buffer to the first display panel and a second frame buffer to the second display panel (e.g., when in an extended mode or an exclusive mode); or transfer a single frame buffer to the first display panel and the second display panel (e.g., when in a mirrored mode).

As discussed, in certain aspects, the phase shift offset(s) computed may not always fully synchronize the synchronizations signals/self-refresh timelines. For example, a given display panel may have a maximum phase shift that it supports during a single refresh period (e.g., also referred to as a frame time), e.g., corresponding to a single period of a self-refresh-timeline. Accordingly, the phase controller may be configured to provide a phase shift offset equal to or below the maximum phase shift to a display panel. In certain aspects, the maximum phase shift is less than the maximum drift in phase difference between synchronization signals. In certain aspects, the maximum phase shift of a panel is based on design of the panel itself, such as how long the panel can hold a charge. In certain aspects, where a display panel supports a variable refresh rate, such a feature allows the display panel to support shifting the phase of the synchronization signal/self-refresh timeline as discussed. The phase controller 145 may be configured to query/receive a phase shift capability from each display panel, the phase shift capability comprising the maximum phase shift supported by the display panel. It should be noted that different panels may have the same or different maximum phase shift supported. In certain aspects, the phase controller 145 is configured to, such as in relation to block 320, determine at least one of a first phase shift capability of the first display panel and a second phase shift capability of the second display panel, wherein the at least one phase shift offset is computed based on the at least one of the first phase shift capability and the second phase shift capability.

Therefore, the phase controller 145 may be configured to send phase shift offsets in multiple different frame times to a single display panel, each incrementally changing the phase of the synchronization signal/self-refresh timeline of the display panel, until the synchronization signals/self-refresh timelines of the multiple display panels are synchronized. For example, in certain aspects, the phase controller 145 is configured to, after block 325, provide a second phase shift offset of the at least one phase shift offset to the first display panel, wherein the first phase shift offset is provided during a first frame time and the second phase shift offset is provided during a second frame time.

For example, if the phase difference between self-refresh timeline 200 and self-refresh timeline 205 is 8 ms, and the maximum phase shift supported by each of display panel 120A and 120B is 2 ms, even if phase controller 145 generates a −2 ms phase shift offset for display panel 120A and a +2 ms phase shift offset for display panel 120B and sends both during the same frame time, the result will still be a 4 ms phase difference between self-refresh timeline 200 and self-refresh timeline 205. Accordingly, the phase controller 145 may provide such phase shift offsets to the display panels for a first frame time. Subsequently, the phase controller 145 may provide additional phase shift offsets for a subsequent frame time to the display panels to fully synchronize the self-refresh timeline 200 and self-refresh timeline 205. In certain aspects, phase controller 145 may be configured to only provide phase shift offsets to a single display panel at a given frame time. In certain aspects, phase controller 145 may be configured to provide phase shift offsets to multiple display panels at a given frame time.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A system for driving a plurality of display panels comprising a first display panel and a second display panel, the system comprising:

a display processor coupled to the plurality of display panels; and a controller coupled to the display processor and the plurality of display panels, the controller being configured to:

receive a first synchronization signal from the first display panel, the first synchronization signal corresponding to a self-refresh timeline of the first display panel;

receive a second synchronization signal from the second display panel, the second synchronization signal corresponding to a self-refresh timeline of the second display panel;

determine a phase difference between the first synchronization signal and the second synchronization signal;

compute at least one phase shift offset based on the determined phase difference, the at least one phase shift offset being configured to reduce the phase difference between the first synchronization signal and the second synchronization signal;

provide a first phase shift offset of the at least one phase shift offset to the first display panel; and provide a unified synchronization signal to the display processor, wherein the first synchronization signal, second synchronization signal, and unified synchronization signal are vertical sync signals.

2. The system of claim 1, wherein the display processor is configured to, in response to receiving the unified synchronization signal:
   generate one or more frame buffers; and
   one of:
     transfer a first frame buffer to the first display panel and a second frame buffer to the second display panel; or
     transfer a single frame buffer to the first display panel and the second display panel.

3. The system of claim 1, wherein the display processor is configured to:
   determine a number of active displays panels of the plurality of display panels; and
   power on the controller when the number of active display panels is two or more.

4. The system of claim 1, wherein the controller is configured to provide a second phase shift offset of the at least one phase shift offset to the second display panel, wherein the controller is configured to provide both the first phase shift offset and the second phase shift offset during a frame time.

5. The system of claim 1, wherein controller is configured to determine at least one of a first phase shift capability of the first display panel and a second phase shift capability of the second display panel, wherein the at least one phase shift offset is computed based on the at least one of the first phase shift capability and the second phase shift capability.

6. The system of claim 1, wherein the controller is configured to provide a second phase shift offset of the at least one phase shift offset to the first display panel, wherein the first phase shift offset is provided during a first frame time and the second phase shift offset is provided during a second frame time.

7. A method for driving a plurality of display panels comprising a first display panel and a second display panel, the method comprising:
   receiving a first synchronization signal from the first display panel, the first synchronization signal corresponding to a self-refresh timeline of the first display panel;
   receiving a second synchronization signal from the second display panel, the second synchronization signal corresponding to a self-refresh timeline of the second display panel;
   determining a phase difference between the first synchronization signal and the second synchronization signal;
   computing at least one phase shift offset based on the determined phase difference, the at least one phase shift offset being configured to reduce the phase difference between the first synchronization signal and the second synchronization signal;
   providing a first phase shift offset of the at least one phase shift offset to the first display panel; and
   providing a unified synchronization signal to a display processor, wherein the first synchronization signal, second synchronization signal, and unified synchronization signal are vertical sync signals.

8. The method of claim 7, further comprising, in response to the unified synchronization signal:
   generating one or more frame buffers; and
   one of:
     transferring a first frame buffer to the first display panel and a second frame buffer to the second display panel; or
     transferring a single frame buffer to the first display panel and the second display panel.

9. The method of claim 7, further comprising:
   determining a number of active displays panels of the plurality of display panels; and
   powering on the controller when the number of active display panels is two or more.

10. The method of claim 7, further comprising providing a second phase shift offset of the at least one phase shift offset to the second display panel, wherein both the first phase shift offset and the second phase shift offset are provided during a frame time.

11. The method of claim 7, further comprising determining at least one of a first phase shift capability of the first display panel and a second phase shift capability of the second display panel, wherein the at least one phase shift offset is computed based on the at least one of the first phase shift capability and the second phase shift capability.

12. The method of claim 7, further comprising providing a second phase shift offset of the at least one phase shift offset to the first display panel, wherein the first phase shift offset is provided during a first frame time and the second phase shift offset is provided during a second frame time.

13. A non-transitory computer-readable storage medium that includes instructions that when executed by a processor cause the processor to perform a method for driving a plurality of display panels including a first display panel and a second display panel, the method comprising:
   receiving a first synchronization signal from the first display panel, the first synchronization signal corresponding to a self-refresh timeline of the first display panel;
   receiving a second synchronization signal from the second display panel, the second synchronization signal corresponding to a self-refresh timeline of the second display panel;
   determining a phase difference between the first synchronization signal and the second synchronization signal;
   computing at least one phase shift offset based on the determined phase difference, the at least one phase shift offset being configured to reduce the phase difference between the first synchronization signal and the second synchronization signal;
   providing a first phase shift offset of the at least one phase shift offset to the first display panel; and
   providing a unified synchronization signal to a display processor, wherein the first synchronization signal, second synchronization signal, and unified synchronization signal are vertical sync signals.

14. The non-transitory computer-readable storage medium of claim 13, wherein the method further comprises, in response to the unified synchronization signal:
   generating one or more frame buffers; and
   one of:
     transferring a first frame buffer to the first display panel and a second frame buffer to the second display panel; or
     transferring a single frame buffer to the first display panel and the second display panel.

15. The non-transitory computer-readable storage medium of claim 13, wherein the method further comprises:
   determining a number of active displays panels of the plurality of display panels; and
   powering on the controller when the number of active display panels is two or more.

16. The non-transitory computer-readable storage medium of claim 13, wherein the method further comprises providing a second phase shift offset of the at least one phase shift offset to the second display panel, wherein both the first phase shift offset and the second phase shift offset are provided during a frame time.

17. The non-transitory computer-readable storage medium of claim 13, wherein the method further comprises determining at least one of a first phase shift capability of the first display panel and a second phase shift capability of the second display panel, wherein the at least one phase shift offset is computed based on the at least one of the first phase shift capability and the second phase shift capability.

18. The non-transitory computer-readable storage medium of claim 13, wherein the method further comprises providing a second phase shift offset of the at least one phase shift offset to the first display panel, wherein the first phase shift offset is provided during a first frame time and the second phase shift offset is provided during a second frame time.

\* \* \* \* \*